US012074387B2

(12) United States Patent
Wang

(10) Patent No.: US 12,074,387 B2
(45) Date of Patent: Aug. 27, 2024

(54) ANTENNA AND ELECTRONIC DEVICE

(71) Applicant: VIVO MOBILE COMMUNICATION CO., LTD., Dongguan (CN)

(72) Inventor: Shen Wang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 215 days.

(21) Appl. No.: 17/727,688

(22) Filed: Apr. 22, 2022

(65) Prior Publication Data

US 2022/0247079 A1 Aug. 4, 2022

Related U.S. Application Data

(63) Continuation of application No. PCT/CN2020/123906, filed on Oct. 27, 2020.

(30) Foreign Application Priority Data

Oct. 30, 2019 (CN) ......................... 201911046671.0

(51) Int. Cl.
*H01Q 5/385* (2015.01)

(52) U.S. Cl.
CPC .................................. *H01Q 5/385* (2015.01)

(58) Field of Classification Search
CPC ........... H01Q 1/38; H01Q 1/50; H01Q 5/385; H01Q 5/40; H01Q 21/08; H01Q 21/24
See application file for complete search history.

(56) References Cited

U.S. PATENT DOCUMENTS

2019/0305430 A1 10/2019 Thai et al.
2021/0013610 A1* 1/2021 Chiang .................. H01Q 21/24
2021/0175636 A1* 6/2021 Lasiter .................. H01Q 21/26
(Continued)

FOREIGN PATENT DOCUMENTS

CN 104916910 A 9/2015
CN 104916910 B * 6/2018
(Continued)

OTHER PUBLICATIONS

International Search Report issued in corresponding International Application No. PCT/CN2020/123906, mailed Jan. 29, 2021, 4 pages.
(Continued)

*Primary Examiner* — Dameon E Levi
*Assistant Examiner* — Leah Rosenberg
(74) *Attorney, Agent, or Firm* — IPX PLLC

(57) ABSTRACT

An antenna and an electronic device are provided. The antenna includes a plate body. The plate body is provided with at least one antenna unit. Each antenna unit includes a groove formed in the plate body, a coupling frame body, four radiators, four couplers, and four electric conductors. The four radiators and the four couplers are disposed in a space enclosed by the coupling frame body. The coupling frame body is disposed in the groove. Each radiator is provided with a feed point. Different electric conductors penetrate through the groove bottom of the groove and are respectively connected to the feed points on different radiators. The four radiators access two pairs of differential signals and are connected to the four electric conductors in a one-to-one correspondence.

13 Claims, 3 Drawing Sheets

(56) References Cited

U.S. PATENT DOCUMENTS

| | | | | |
|---|---|---|---|---|
| 2021/0218134 | A1* | 7/2021 | Huang | H01Q 21/0006 |
| 2021/0313694 | A1* | 10/2021 | Lim | H01Q 5/385 |
| 2022/0085501 | A1* | 3/2022 | Jian | H01Q 5/371 |

FOREIGN PATENT DOCUMENTS

| | | | | | |
|---|---|---|---|---|---|
| CN | 109346829 | A | | 2/2019 | |
| CN | 109713440 | A | | 5/2019 | |
| CN | 109742533 | A | * | 5/2019 | |
| CN | 109742533 | A | | 5/2019 | |
| CN | 110098465 | A | | 8/2019 | |
| CN | 110212283 | A | | 9/2019 | |
| CN | 110649384 | A | | 1/2020 | |
| CN | 110098465 | B | * | 10/2021 | H01Q 1/22 |

OTHER PUBLICATIONS

First Office Action issued in related Chinese Application No. 201911046671.0, mailed Jul. 24, 2020, 7 pages.

Extended European Search Report issued in related European Application No. 20881076.2, mailed Oct. 24, 2022, 10 pages.

Office Action issued in related Korean Application No. 10-2022-7016034, mailed Sep. 19, 2023, 10 pages.

Notice of Reasons for Refusal issued in related Japanese Application No. 2022-523546, mailed Jun. 6, 2023, 3 pages.

* cited by examiner

ANTENNA AND ELECTRONIC DEVICE

CROSS REFERENCE TO RELATED APPLICATIONS

This application is a continuation of International Application No. PCT/CN2020/123906, filed on Oct. 27, 2020, which claims priority to Chinese Patent Application No. 201911046671.0, filed on Oct. 30, 2019, both of which are incorporated herein by reference in their entireties.

TECHNICAL FIELD

The present disclosure relates to the field of communications technologies, and in particular, to an antenna and an electronic device.

BACKGROUND

With rapid development of communications technologies, multi-antenna communication has become a mainstream and future development trend of electronic devices. In addition, in this process, millimeter-wave antennas are gradually introduced to the electronic devices. Millimeter-wave antennas can provide a higher communication speed, lower latency, more simultaneous connections, and the like, bringing greater convenience to users' life.

However, in the prior art, radiation performance of a millimeter-wave antenna is relatively low.

SUMMARY

Embodiments of the present disclosure provide an antenna and an electronic device.

According to a first aspect, an embodiment of the present disclosure provides an antenna, including a plate body, where the plate body is provided with at least one antenna unit, each antenna unit includes a groove formed in the plate body, a coupling frame body, four radiators, four couplers, and four electric conductors, the four radiators and the four couplers are all disposed in a space enclosed by the coupling frame body, the coupling frame body is disposed in the groove, each radiator is provided with a feed point, the different electric conductors penetrate through the groove bottom of the groove and are respectively connected to the feed points on the different radiators, and the four radiators are connected to the four electric conductors in a one-to-one correspondence; the four radiators access two pairs of differential signals; and the plate body, the coupling frame body, the four radiators, and the four couplers are not in contact with one another, the space between the plate body, the coupling frame body, the four radiators, and the four couplers is filled with an insulating medium, and the four electric conductors and the groove bottom of the groove are disposed in an insulation manner.

According to a second aspect, an embodiment of the present disclosure provides an electronic device, including the foregoing antenna, where the electronic device further includes a metal frame, and the plate body of the antenna is a part of the metal frame.

An antenna provided in the embodiments of the present disclosure includes a plate body, where the plate body is provided with at least one antenna unit, each antenna unit includes a groove formed in the plate body, a coupling frame body, four radiators, four couplers, and four electric conductors, the four radiators and the four couplers are all disposed in a space enclosed by the coupling frame body, the coupling frame body is disposed in the groove, each radiator is provided with a feed point, the different electric conductors penetrate through the groove bottom of the groove and are respectively connected to the feed points on the different radiators, and the four radiators are connected to the four electric conductors in a one-to-one correspondence; the four radiators access two pairs of differential signals; and the plate body, the coupling frame body, the four radiators, and the four couplers are not in contact with one another, a space between the plate body, the coupling frame body, the four radiators, and the four couplers is filled with an insulating medium, and the four electric conductors and the groove bottom of the groove are disposed in an insulation manner.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DETAILED DESCRIPTION

The following clearly and completely describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

Figure 1:
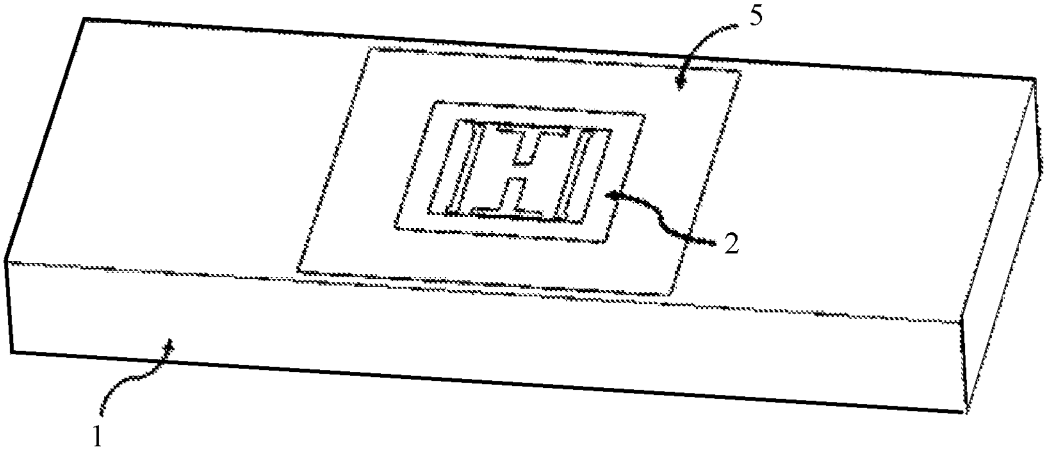
FIG. 1 is a first schematic structural diagram of an antenna according to an embodiment of the present disclosure.
Figure 2:
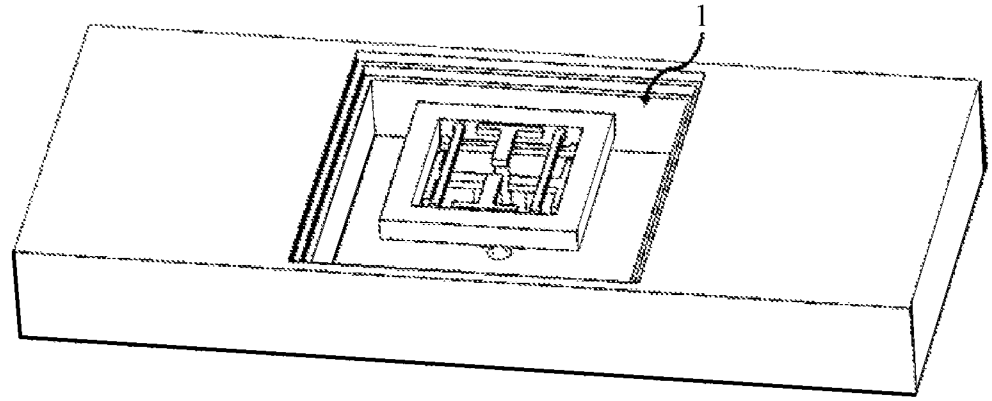
FIG. 2 is a second schematic structural diagram of an antenna according to an embodiment of the present disclosure.
Figure 3:
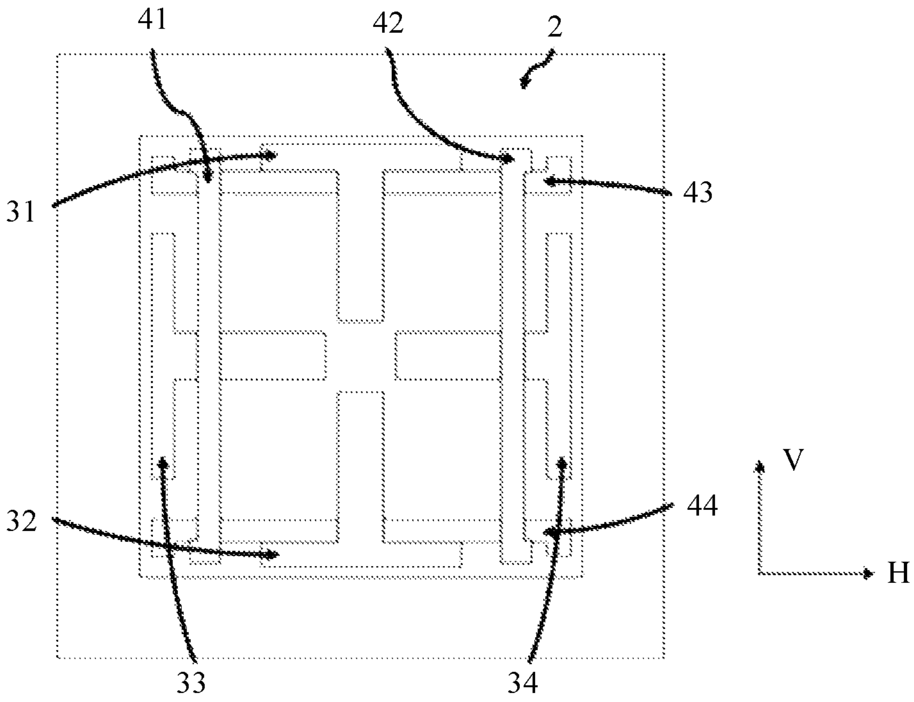
FIG. 3 is a third schematic structural diagram of an antenna according to an embodiment of the present disclosure.

FIG. 1 to FIG. 3 are all schematic structural diagrams of an antenna according to an embodiment of the present disclosure. As shown in FIG. 1 to FIG. 3, the antenna includes a plate body 1, where the plate body 1 is provided with at least one antenna unit, and each antenna unit includes a groove formed in the plate body 1, a coupling frame body 2, four radiators 3, four couplers 4, and four electric conductors. The four radiators 3 and the four couplers 4 are all disposed in a space enclosed by the coupling frame body 2. The coupling frame body 2 is disposed in the groove. Each radiator 3 is provided with a feed point. The different electric conductors penetrate through the groove bottom of the groove and are respectively connected to the feed points on the different radiators. The four radiators 3 are connected to the four electric conductors in a one-to-one correspondence. The four radiators 3 access two pairs of differential signals.

The plate body 1, the coupling frame body 2, the four radiators 3, and the four couplers 4 are not in contact with one another, and a space between the plate body 1, the coupling frame body 2, the four radiators 3, and the four couplers 4 is filled with an insulating medium 5. The four electric conductors and the groove bottom of the groove are disposed in an insulation manner.

In this embodiment, FIG. 1 is a schematic structural diagram of an antenna with a groove being filled with an insulating medium 5, and FIG. 2 is a schematic structural diagram of an antenna with a groove from which an insulating medium 5 is removed. The foregoing antenna unit may be a millimeter-wave antenna unit. The foregoing groove may be a rectangular groove. The foregoing coupling frame body 2 may be a rectangular frame body. The foregoing radiators 3 may be T-shaped. The foregoing couplers 4 may be strip-shaped.

In this embodiment, the foregoing four radiators 3 and four couplers 4 may be disposed in layers in the space. For example, two radiators 3 and two couplers 4 are disposed in a first layer in the space, and the other two radiators 3 and the other two couplers 4 are disposed in a second layer in the space.

As shown in FIG. 3, the four radiators 3 may include a first radiator 31, a second radiator 32, a third radiator 33, and a fourth radiator 34. The four couplers 4 may include a first coupler 41, a second coupler 42, a third coupler 43, and a fourth coupler 44. The first radiator 31, the second radiator 32, the first coupler 41, and the second coupler 42 may be disposed in the first layer in the space. The third radiator 33, the fourth radiator 34, the third coupler 43, and the fourth coupler 44 may be disposed in the second layer in the space.

The four radiators 3 may radiate low-frequency signals, the four couplers 4 may radiate high-frequency signals, and the coupling frame body 2 may radiate low-frequency signals. The foregoing four radiators access two pairs of differential signals, which can implement a dual polarization feature. In this way, through reasonable disposing of radiators and couplers in layers, radiators with radiation frequency bands and a polarization characteristic are constructed, so that an antenna unit can implement coverage of dual polarization and two resonant frequencies in a limited space, thereby improving radiation performance of a millimeter-wave antenna. In addition, the antenna unit may be designed to be disposed on a metal frame. Therefore, in a metal main body design, a millimeter-wave antenna may also be designed to be disposed on the metal main body, to be better designed and integrated with another low-frequency antenna.

In this embodiment, the foregoing electronic device may be a mobile phone, a tablet personal computer, a laptop computer, a Personal Digital Assistant (PDA), a Mobile Internet Device (MID), a wearable device, or the like.

In some embodiments, the four radiators 3 include a first radiator 31, a second radiator 32, a third radiator 33, and a fourth radiator 34, the four couplers 4 include a first coupler 41, a second coupler 42, a third coupler 43, and a fourth coupler 44, and the space enclosed by the coupling frame body includes a first space and a second space that are stacked.

The first radiator 31, the second radiator 32, the first coupler 41, and the second coupler 42 are all disposed in the first space, the first radiator 31 and the second radiator 32 are symmetrically disposed, the first coupler 41 and the second coupler 42 are symmetrically disposed, and the first radiator 31 and the second radiator 32 are both disposed between the first coupler 41 and the second coupler 42.

The third radiator 33, the fourth radiator 34, the third coupler 43, and the fourth coupler 44 are all disposed in the second space, the third radiator 33 and the fourth radiator 34 are symmetrically disposed, the third coupler 43 and the fourth coupler 44 are symmetrically disposed, and the third radiator 33 and the fourth radiator 34 are both disposed between the third coupler 43 and the fourth coupler 44.

In this implementation, reference may be made to FIG. 3 to better understand the foregoing structure. As shown in FIG. 3, the foregoing first radiator 31, second radiator 32, first coupler 41, and second coupler 42 are all disposed in the foregoing first space, the foregoing first radiator 31 and second radiator 32 are symmetrically disposed, the foregoing first coupler 41 and second coupler 42 are symmetrically disposed, and the foregoing first radiator 31 and second radiator 32 are both disposed between the foregoing first coupler 41 and second coupler 42.

In this implementation, the foregoing third radiator 33, fourth radiator 34, third coupler 43, and fourth coupler 44 are all disposed in the second space, the foregoing third radiator 33 and fourth radiator 34 are symmetrically disposed, the foregoing third coupler 43 and fourth coupler 44 are symmetrically disposed, and the foregoing third radiator 33 and fourth radiator 34 are both disposed between the foregoing third coupler 43 and fourth coupler 44.

It should be noted that, the foregoing first space and second space may be understood as two stacked layers in the space. In this way, through composite construction of a plurality of radiators in each type of polarization, directivity and gain in each type of polarization are improved.

In some embodiments, an axis of symmetry of the first radiator and the second radiator is perpendicular to an axis of symmetry of the third radiator and the fourth radiator.

In this implementation, the axis of symmetry of the foregoing first radiator and second radiator is perpendicular to the axis of symmetry of the foregoing third radiator and fourth radiator, which can make an antenna radiation pattern have higher left-right symmetry.

In some embodiments, a feed signal of the first radiator and a feed signal of the second radiator have same magnitude but different phase, and a feed signal of the third radiator and a feed signal of the fourth radiator have same magnitude but different phase.

Figure 4:
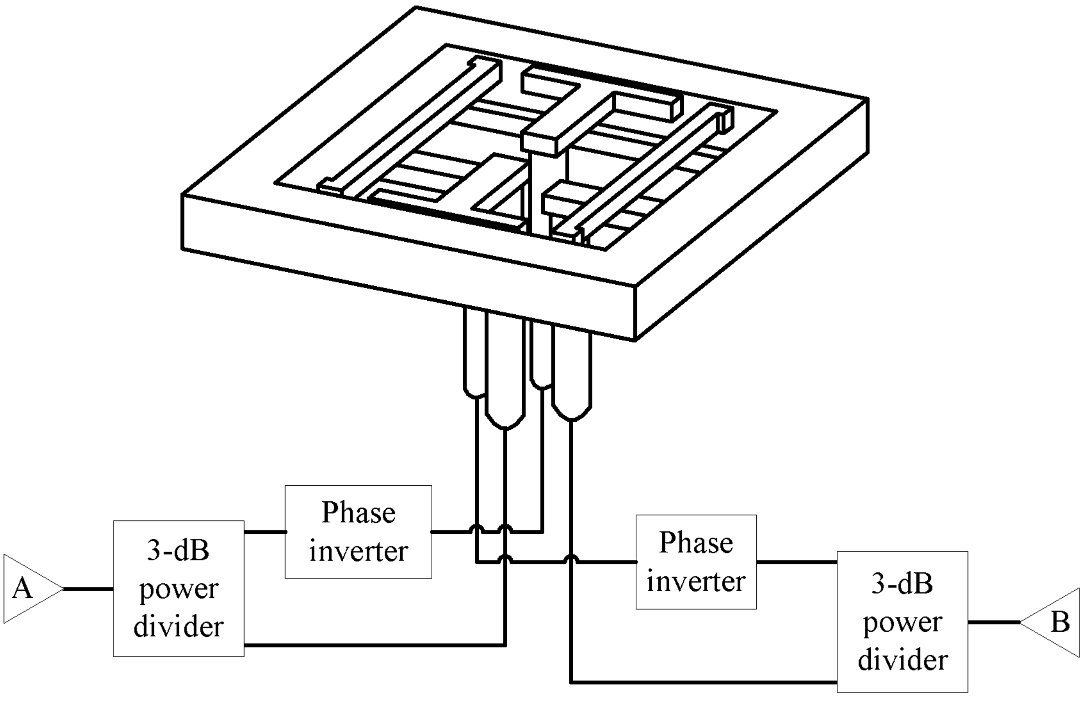
FIG. 4 is a fourth schematic structural diagram of an antenna according to an embodiment of the present disclosure.

To better understand the foregoing feeding method, reference is made to FIG. 4 for understanding. FIG. 4 is a schematic structural diagram of an antenna according to an embodiment of the present disclosure. As shown in FIG. 4, a feed signal A and a feed signal B are two polarized signals in dual-polarization. Each signal is divided by a 3-db power divider into two equal-amplitude and in-phase signal branches. One signal branch of each signal is further subjected to current phase inversion of a 180-degree phase inverter, to obtain two differential and inverse-phase feed branches, which are respectively fed into corresponding ports of an antenna with a 180-degree phase difference. The two differential and inverse-phase feed branches, obtained after the processing by the power divider and the phase inverter, of each of the feed signal A and the feed signal B are respectively connected to a low-frequency V-polarization feed radiator (namely, the first radiator 31 and the second radiator 32) and a low-frequency H-polarization feed radiator (namely, the third radiator 33 and the fourth radiator 34) of the antenna by using electric conductors.

The first coupler 41 and the second coupler 42 are coupled to both the first radiator 31 and the second radiator 32. The third coupler 43 and the fourth coupler 44 are coupled to both the third radiator 33 and the fourth radiator 34. The first coupler 41 and the second coupler 42 are high-frequency V-polarization, the first radiator 31 and the second radiator 32 are low-frequency V-polarization, the third coupler 43 and the fourth coupler 44 are high-frequency H-polarization, and the third radiator 33 and the fourth radiator 34 are low-frequency H-polarization.

V-polarization and H-polarization are two types of polarization perpendicular to each other, and their polarization directions are defined in the coordinates shown in FIG. 3. A low-frequency V-polarization/H-polarization coupling radiation frame (namely, the coupling frame body 2), a high-frequency V-polarization coupling radiator (namely, the first coupler 41 and the second coupler 42), and a high-frequency H-polarization coupling radiator (namely, the third coupler 43 and the fourth coupler 44) generate an electromagnetic induction current through electromagnetic coupling with feed radiators, so that radiation is generated. With such a structure, the millimeter-wave antenna in the present disclosure is endowed with features of dual-frequency resonance and dual polarization.

In the foregoing feed method, through composite construction of a plurality of radiators in each type of polarization, directivity and gain in each type of polarization are improved. Differential feeding is used, so that an antenna radiation pattern has higher left-right symmetry. Two polarized feed branches are respectively fed into mutually separated feed radiators, so that the antenna has higher polarization purity and port isolation between two types of polarization. The antenna unit in the present disclosure has higher gain. Therefore, array gain can meet requirements of 3rd Generation Partnership Project (3GPP) even if less array antenna units are used, which reduces array dimensions compared with an existing design.

In some embodiments, a step structure is disposed at an opening of the groove.

In this implementation, reference may be made to FIG. 2 for understanding. As shown in FIG. 2, a step structure is disposed at an opening of the foregoing groove. The step structure may be used for fine tuning of a resonance frequency of the antenna, so that radiation performance of the antenna is higher.

In some embodiments, the plate body is provided with at least two antenna units, and the at least two antenna units are arranged in a longitudinal direction of the plate body.

Figure 5:
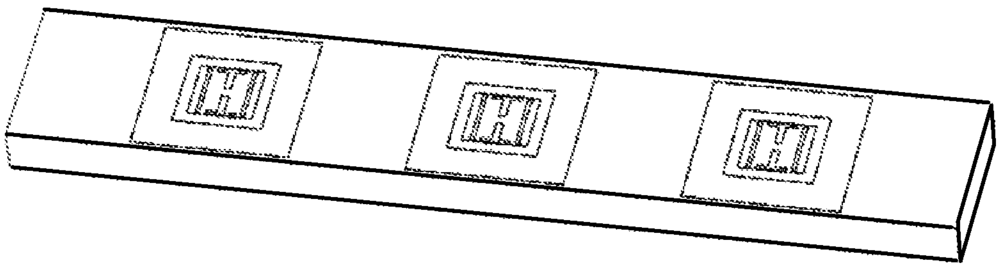
FIG. 5 is a fifth schematic structural diagram of an antenna according to an embodiment of the present disclosure.

In this implementation, reference may be made to FIG. 5 for understanding. FIG. 5 is a schematic structural diagram of an antenna according to an embodiment of the present disclosure. As shown in FIG. 5, the antenna is provided with at least two antenna units. The at least two antenna units are arranged in a longitudinal direction of the antenna, which helps form an antenna array. The antenna array may be a millimeter-wave antenna array. After the antenna array is formed, beam forming and beam sweeping may be performed for the antenna array through simultaneous feeding and by adjusting a feed phase difference between sub-antenna units, thereby improving radiation directivity and gain of the antenna, and improving spatial coverage of radiation.

Certainly, a position of each radiator in the antenna unit may be adjusted and optimized without changing a general structure of the antenna unit, or directions of antenna units that constitute the array may be collectively adjusted by 90 degrees, and so on.

In some embodiments, openings of grooves of the at least two antenna units face a same direction.

In this implementation, reference may also be made to FIG. 5 for understanding. As shown in FIG. 5, openings of grooves of the foregoing at least two antenna units face a same direction.

In some embodiments, the at least one antenna unit is a millimeter-wave antenna unit.

In this implementation, the foregoing at least one antenna unit is a millimeter-wave antenna unit.

In some embodiments, one surface, away from the groove bottom of the groove, of each of the first radiator, the second radiator, the first coupler, and the second coupler is aligned with a plane where an outer side wall of the plate body is located.

In this implementation, reference may be made to FIG. 1 for understanding. As shown in FIG. 1, one surface, away from the groove bottom of the foregoing groove, of each of the foregoing first radiator, second radiator, first coupler, and second coupler is aligned with a plane where an outer side wall of the plate body is located. Through such a disposing manner, it can be ensured that the electronic device has a better appearance.

In some embodiments, the space enclosed by the coupling frame body is a rectangular space.

In this implementation, the space enclosed by the coupling frame body is a rectangular space.

In some embodiments, each of the four radiators has a T-shaped structure.

In this implementation, each of the foregoing four radiators has a T-shaped structure.

An embodiment of the present disclosure provides an electronic device, including a plate body 1, where the plate body 1 is provided with at least one antenna unit, each antenna unit includes a groove formed in the plate body 1, a coupling frame body 2, four radiators 3, four couplers 4, and four electric conductors, the four radiators 3 and the four couplers 4 are all disposed in a space enclosed by the coupling frame body 2, the coupling frame body 2 is disposed in the groove, each radiator 3 is provided with a feed point, the different electric conductors penetrate through the groove bottom of the groove and are respectively connected to the feed points on the different radiators, and the four radiators 3 are connected to the four electric conductors in a one-to-one correspondence; the four radiators 3 access two pairs of differential signals; and the plate body 1, the coupling frame body 2, the four radiators 3, and the four couplers 4 are not in contact with one another, a space between the plate body 1, the coupling frame body 2, the four radiators 3, and the four couplers 4 is filled with an insulating medium 5, and the four electric conductors and the groove bottom of the groove are disposed in an insulation manner. This embodiment of the present disclosure can improve radiation performance of a millimeter-wave antenna.

An embodiment of the present disclosure further provides an electronic device, including the foregoing antenna, where the electronic device further includes a metal frame, and the plate body of the antenna is a part of the metal frame.

In some embodiments, the antenna further includes a first antenna, a radiator where at least one antenna unit of the antenna is located is a radiator of the first antenna, the radiator is at least a part of the plate body, and the first antenna is a non-millimeter-wave antenna.

In this implementation, the foregoing antenna further includes a first antenna, a radiator where at least one antenna unit of the antenna is located is a radiator of the first antenna, the radiator is at least a part of the plate body, and the first antenna is a non-millimeter-wave antenna. In other words, the at least one antenna unit may be disposed on a radiator of a cellular antenna or non-cellular antenna, to share one radiator with the cellular antenna or non-cellular antenna.

It should be noted that, in this specification, the terms "include", "comprise", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. An element limited by "includes a . . . " does not, without more constraints, preclude the presence of additional identical elements in the process, method, article, or device that includes the element.

The embodiments of the present disclosure are described above with reference to the accompanying drawings. However, the present disclosure is not limited to the foregoing specific implementations. The foregoing specific implementations are merely exemplary, but are not limiting. Under the enlightenment of the present disclosure, a person of ordinary skill in the art may make many forms without departing from the objective and the scope of the claims of the present disclosure, and all of which fall within the protection of the present disclosure.

The invention claimed is:

1. An antenna, comprising:

a plate body;

at least one antenna unit on the plate body, each antenna unit comprising:

a groove formed in the plate body;

a coupling frame body;

four radiators;

four couplers; and four electric conductors, wherein the four radiators and the four couplers are all disposed in a space enclosed by the coupling frame body;

the coupling frame body is disposed in the groove, each radiator comprises a feed point;

the different electric conductors penetrate through a groove bottom of the groove and are respectively connected to the feed points on the different radiators;

the four radiators are connected to the four electric conductors in a one-to-one correspondence;

the four radiators access two pairs of differential signals; and the plate body, the coupling frame body, the four radiators, and the four couplers are not in contact with one another, a space between the plate body, the coupling frame body, the four radiators, and the four couplers is filled with an insulating medium, and the four electric conductors and the groove bottom of the groove are disposed in an insulation manner.

2. The antenna according to claim 1, wherein the four radiators comprise:

a first radiator;

a second radiator;

a third radiator; and a fourth radiator, wherein the four couplers comprise:

a first coupler;

a second coupler;

a third coupler; and a fourth coupler, wherein the space enclosed by the coupling frame body comprises:

a first space; and a second space, wherein the first space and the second space are stacked, the first radiator, the second radiator, the first coupler, and the second coupler are all disposed in the first space, the first radiator and the second radiator are symmetrically disposed, the first coupler and the second coupler are symmetrically disposed, the first radiator and the second radiator are both disposed between the first coupler and the second coupler, the third radiator, the fourth radiator, the third coupler, and the fourth coupler are all disposed in the second space, the third radiator and the fourth radiator are symmetrically disposed, the third coupler and the fourth coupler are symmetrically disposed, and the third radiator and the fourth radiator are both disposed between the third coupler and the fourth coupler.

3. The antenna according to claim 2, wherein an axis of symmetry of the first radiator and the second radiator is perpendicular to an axis of symmetry of the third radiator and the fourth radiator.

4. The antenna according to claim 2, wherein a feed signal of the first radiator and a feed signal of the second radiator have same magnitude but different phase, and a feed signal of the third radiator and a feed signal of the fourth radiator have same magnitude but different phase.

5. The antenna according to claim 1, wherein a step structure is disposed at an opening of the groove.

6. The antenna according to claim 1, wherein the plate body is provided with at least two antenna units, and the at least two antenna units are arranged in a longitudinal direction of the plate body.

7. The antenna according to claim 6, wherein openings of the grooves of the at least two antenna units face a same direction.

8. The antenna according to claim 1, wherein the at least one antenna unit is a millimeter-wave antenna unit.

9. The antenna according to claim 2, wherein one surface, away from the groove bottom of the groove, of each of the first radiator, the second radiator, the first coupler, and the second coupler is aligned with a plane where an outer side wall of the plate body is located.

10. The antenna according to claim 1, wherein the space enclosed by the coupling frame body is a rectangular space.

11. The antenna according to claim 1, wherein each of the four radiators is of a T-shaped structure.

12. An electronic device, comprising the antenna according to claim 1, wherein the electronic device further comprises a metal frame, and the plate body of the antenna is a part of the metal frame.

13. The electronic device according to claim 12, wherein the antenna further comprises a first antenna unit, wherein the first antenna unit comprises one or more radiators of the at least one antenna unit of the antenna, the one or more radiators are at least a part of the plate body, and the first antenna is a non-millimeter-wave antenna.

* * * * *